United States Patent Office 3,244,772
Patented Apr. 5, 1966

3,244,772
PROCESS FOR WATER-IN-OIL POLYMERIZATION OF VINYL COMPOSITIONS
Wulf von Bonin, Leverkusen, and Herbert Bartl, Cologne-Stammheim, Germany, assignors to Farbenfabriken Bayer Aktiengesellschaft, Leverkusen, Germany, a corporation of Germany
No Drawing. Filed May 25, 1962, Ser. No. 197,566
Claims priority, application Germany, June 3, 1961,
F 34,086
12 Claims. (Cl. 260—861)

The present invention relates to a process for polymerization in reversed emulsion and to polymeric materials prepared according to this process.

In U.S. patent specification Ser. No. 114,658, filed May 6, 1961, a process for the production of polymers with a raised softening point has been described. In said process monomeric vinyl compounds, possibly in the presence of organic solvents which are immiscible with water, are emulsified with special emulsifiers which are capable of forming reversed emulsions to provide emulsions of the water-in-oil type and are polymerised with the aid of radical formers which are known per se.

The polymers prepared in this way are distinguished from the polymers of the same monomers prepared with the same activators by block, solution, or normal emulsion polymerisation and of the oil-in-water type by a higher softening point. Since it is advantageous with this process if the reversal emulsifiers which are used can remain in the polymer it is desirable to use those reversal emulsifiers which have a highest possible efficiency as a reversely operating emulsifier, so that smallest possible quantities of this emulsifier are required. An additional aim is that the emulsification auxiliaries should have highest possible compatibility with the polymers.

It has now been found that graft copolymers, which can be obtained by grafting polymerisable vinyl compounds on to polyalkylene oxides or preferably polyalkylene oxide derivatives, are suitable in a particularly advantageous manner for the production of reversed emulsions (i.e., emulsion of the water-in-oil type) of polymerisable vinyl monomers. The reversal emulsifiers to be used for the process of the present invention can be prepared in a manner known per se by grafting to a polyalkylene oxide polymerisable vinylidene or preferably vinyl compounds, such as (a) Esters of vinyl alcohol and a saturated aliphatic monocarboxylic acid of from 2 to 18 carbon atoms for example vinyl acetate, vinyl propionate, vinyl butyrate, vinylstearate etc., and also (b) Esters of acrylic or methacrylic acid with aliphatic (and cycloaliphatic) saturated monohydric alcohols having from 1 to 6 carbon atoms, such as ethyl acrylate, propyl acrylate, butyl acrylate, and cyclohexylacrylate, as well as the corresponding methacrylates.

In special cases furthermore it is possible to use as grafting monomers conjugated aliphatic diolefines of from 4 to 6 carbon atoms, such as butadiene, 2,3-dimethyl butadiene or isopropene.

As polyalkylene oxides or polyalkylene oxide derivatives suitable for the preparation of these reversal emulsifiers there are more especially to be considered water-soluble polyalkylene oxides containing at least two polyethylene oxide units (i.e., containing units

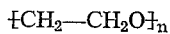

and having a molecular weight of at least 500. As specific examples there are to be mentioned polyethylene oxide and also copolymers of ethylene oxide with alkylene oxides, such as propylene oxide, tetrahydrofuran, etc., having a molecular weight of at least 500, whereby in said copolymers the amount of the comonomer propylene oxide, tetrahydrofurane etc. is preferably within the limits from 1 to 10%. The upper limit of the molecular weight is given by the condition of solubility in water.

As grafting base, there are additionally to be considered polyalkylene oxide derivatives, more especially the reaction products of polyalkylene oxides, such as reaction products of polyethylene oxide or its above mentioned copolymers with 0.5–30% of an α,β-unsaturated dicarboxylic acid anhydride, such as maleic acid anhydride.

These graft polymers may be obtained in a manner known per se, for example, as described in detail in Deutsche Auslegeschrift, 1,111,394 the polyalkylene oxides or polyalkylene glycols are dissolved in the vinyl monomers to be used in a ratio which may vary between 1:99 and 99:1, with or without additional solvents, and are polymerised in homogeneous phase after adding free radical-forming substances as polymerization activators.

Within the scope of the present invention the preferred graft copolymers are those prepared by grafting vinylidene or vinyl monomers to polyalkylene oxides, the graft monomer component being used within a ratio of from 30 up to 300% by weight, based on the amount of polyalkylene oxide employed.

The process of the present invention is suitable for the production of reversed emulsions of the water-in-oil type of very different water-insoluble monomers containing at least one $CH_2=C<$-group. The present process is more especially to be considered for the production of reversed emulsions of compounds which represent members of the following group: aromatic vinyl compounds such as styrene, styrenes alkylated in the nucleus or side chains or divinyl benzene, esters of vinyl-alcohol with an aliphatic saturated monocarboxylic acid having from 2 to 4 carbon atoms, such as vinylacetate, vinylpropionate etc., the esters of methacrylic acid, and acrylic acid with saturated monohydric alcohols containing from 1 to 6 carbon atoms such as ethyl methacrylate, ethyl acrylate, propyl acrylate or propyl methacrylate, butyl methacrylate and cyclohexyl methacrylate as well as the corresponding esters of acrylic acid, furthermore acrylonitrile.

It is of course also possible, for the production of cross-linked polymers, to polymerise the aforementioned monomers in the presence of from 0.05 to 90%, preferably 0.05 to 50% of other monomers carrying several olefinically unsaturated double bonds, for which the following are to be mentioned as examples: glycol dimethacrylate, triallylcyanurate, triacrylyl-s-perhydrotriazine, trivinyl benzene. Furthermore, it is possible for the aforementioned vinyl monomers to be subjected to copolymerisation with, for example, semi-esters of fumaric or maleic acids. Furthermore it is of cause possible to polymerize the aforementioned monomers in admixture with one another.

One particular modification of the process according to the present invention consists for example in copolymerising vinyl monomers having at least one polymerisable $Ch_2=CH$-grouping, preferably styrene with unsaturated polyesters containing polymerisable double bonds, more especially those of α,β-unsaturated dicarboxylic acids such as for example maleic acid and fumaric acid and at least dihydric alcohols such as ethylen glycol, diethylene glycol, triethylene glycol, 1,2- and 1,3-propanediol, 2,2-dimethyl propanediol, as well as polyhydric alcohols such as 1,1,1-trimethylol propans, glycerine and the like. The ratio between the polyester-copolymer components is within the usual limits in preparing copolymers of the alkyd resin type, i.a. normally a ratio between unsaturated polyester and vinyl monomer of between 9:1 to 1:9 is employed.

For carrying out the process according to the invention, first of all the reversal emulsifiers (and if required the polymerisation initiator) is dissolved in the monomer to be polymerized. With steady stirring and if reqiured with exclusion of air, the quantity of water to be incorporated into the emulsion and possibly containing the polymerisation initiator, is introduced into the monomer, it being necessary to ensure that the water initially is added slowly or in portions, since otherwise in certain circumtances a reversed emulsion is not formed. On the other hand, with high water contents which are in the region of the stability limit of the reversed emulsion, stirring must not be carried out too vigorously, since the emulsion can otherwise be destroyed. The reversed emulsion has a creamy character and becomes more viscous with increasing water content, but generally is capable of being poured without being decomposed.

For the production of the reversed emulsion, the graft copolymers can be used in solvents, such as esters, perhaps ethyl acetate, in ethers such as diethyl ether or dioxane, in aromatic substances, such as benzene, chlorobenzene, or in alkyl halides, such as chloroform, or can be introduced as pure substance.

For the present process, the graft copolymers to be used as reversal emulsifiers are preferably introduced in quantities of 0.1 to 20%, advantageously 0.5 to 10% related on monomers (preferably an oil-phase if solvents are employed).

The reversed emulsion to be polymerised can contain 5 to 4,000%, preferably 200 to 2,000%, of water, based on the amount of the monomer. Said reversed emulsion is thinly liquid with small water contents and acquires a creamy to stiff consistency as the water content increases.

As initiators for the polymerisation of the reversed emulsion, all radical formers of Redox systems suitable for polymerisation purposes can be used, both of the monomer-soluble and water-soluble type, for example radical-forming nitrogen compounds such as azodiisobutyric acid dinitrile, peroxides, and especially acyl peroxides such as lauroyl peroxide, benzoyl peroxide, alkyl as well as dialkyl peroxides such as tert. butylhydroperoxide, cumene hydroperoxide, p-menthane hydroperoxide, di-tert.butylhydroperoxide, ketone peroxides such as cyclohexanone peroxide, percarbonates, combinations of the peroxides with amines, such as dimethyl-p-toluidine, diethanolamine, and triethylene-tetramine, or metal compounds such as cobalt naphthenate. Peroxides whose half life period below 100° C. is below 10 hours are of preferred interest as polymerization initiators. Suitable as water-soluble initiators are for example persulphates, especially alkali metal persulphates such as potassium persulphate, possibly in combination with reducing agents, such as pyrosulphites, formaldehyde sulphoxylate, triethylamine and others.

The initiators referred to above are usually employed in quantities from 0.1 to 5% by weight, calculated on the total monomer quantity in the case of monomer-soluble initiators, and based on the total water quantity in the case of water-soluble initiators.

The polymerisation temperatures depend on the initiator or initiator system which is used and are for example between 10 and 100° C., and even higher than 100° C. when using high pressures. It is preferred to select temperatures between 25 and 80° C. or the polymerisation is started in this temperature range and it is completed at temperatures above 80° C.

The process of the present invention is suitable both for preparing polymers and copolymers which are not cross-linked and also those which are cross-linked. After removing the water contained in the polymer, highly porous compositions are obtained. They can for example be used as insulating materials with thermal stability, hardness and water resistance values which can be adjustable within wide limits. The polymers can also serve as starting material for the production of exchanger compositions or fillers. The undried polymers feel dry and can serve for air-conditioning rooms or for keeping plants fresh. The reversed emulsions can also be poured into hollow moulds and be polymerised therein, whereby shaping or reinforcing effects can be obtained. The dried and shredded polymers are suitable as absorption agents and supports for active substances. Furthermore, they are suitable for the manufacture of injection moulding compositions.

The possibility of being able to influence the pore structure and also the drying and strength properties of the polymers and the shrinkage thereof is of great interest. This can be successfully achieved by adding varying quantities of maleic acid semi-esters or other substances which influence the stability of the reversed emulsion and as such there are also to be considered fillers such as sawdust, chalk and the like.

The parts indicated in the following examples are parts by weight unless otherwise mentioned.

*Examples 1 to 11*

For the production of the reversed monomer emulsions listed in the following table, the following graft polymers of polymerisable vinyl monomers on hydrophilic compounds of high molecular weight were used as emulsifiers:

A: Vinyl acetate, grafted on to the same quantity by weight of polyethylene oxide having the molecular weight 500.
B: Vinylacetate, grafted on to half the quantity by weight of polyethylene oxide with the molecular weight 1500.
C: Vinyl acetate, grafted on to half the quantity by weight of polyethylene oxide with the molecular weight 2500.
D: Vinyl acetate, grafted on to half the quantity by weight of polyethylene oxide with the molecular weight 1600, which had been stirred beforehand with 1.5 parts by weight of maleic acid anhydride at 110° C. for three hours.
E: Vinyl acetate, grafted on to the same quantity by weight of a polyalkylene oxide, which is formed from 29% by weight of tetrahydrofuran and 71% by weight of ethylene oxide.
F: Vinyl acetate, grafted on to 33% by weight of the modified polyethylene oxide used in the case of emulsifier D.
G: Ethyl acrylate, grafted on to half the quantity by weight of polyethylene oxide with the molecular weight 1500.
H: Methyl methacrylate, grafted on to half the quantity by weight of polyethylene oxide with the molecular weight 1500.

In the above described graft polymer emulsifiers vinylacetate as grafting component may be replaced by other vinylesters such as vinylpropionate without disadvantage.

Before the preparation of the reversed emulsion, the monomer-soluble activators are dissolved in the organic phase, while the water-soluble activators are added to the water during the mixing. The emulsions of Experiments Nos. 2 and 3 are produced under nitrogen with exclusion of air.

| Experiment No. | 1 | 2 | 3 | 4 | 5 | 6 | 7 | 8 | 9 | 10 | 11 |
|---|---|---|---|---|---|---|---|---|---|---|---|
| Monomer: | | | | | | | | | | | |
| Styrene | 98 | 90 | 85 | | 87 | | | 80 | 60 | | 100 |
| Methyl methacrylate | | | | 100 | | 85 | | | | 100 | |
| Cyclohexyl methacrylate | | | | | | | 100 | | | | |
| Methyl acrylate | | | | | | | | 10 | | | |
| Comonomers: | | | | | | | | | | | |
| Divinyl benzene | | | 5 | | | | | | | | |
| Maleic acid monocyclohexyl ester | | | | 10 | | | | | | | |
| Maleic acid glycolpolyester | | | | | 10 | | | | 40 | | |
| Glycol dimethacrylate | | | | | | 15 | | | | | |
| Triallyl cyanurate | | | | | | | | 5 | | | |
| Emulsifier | E 5 | D 5 | D 5 | H 4 | G 3 | F 8 | C 3 | G 5 | B 2 | A 5 | D 3 |
| Activator: | | | | | | | | | | | |
| Cobalt naphthenate | | | | | | | | | 1 | | |
| Benzoyl peroxide | | | 2 | | | | | | | 0.5 | |
| Lauroyl peroxide | | | | 1 | | | | | | 0.5 | |
| Cyclohexanone peroxide | | | | | | | | | 2 | | |
| Potassium persulphate | | | 2 | | 2 | | | 1 | | | 4 |
| Triethanolamine | | | | | | 1 | | | | | |
| Na-pyrosulphite | | | 2 | | 0.5 | | | 1 | | | 2 |
| p-Dimethyl toluidine | | | 1 | | | | | | | | |
| Azodiisobutyronitrile | 2 | | | | | 1 | 1 | | | | |
| Water | 150 | 1,500 | 1,000 | 600 | 900 | 350 | 200 | 300 | 100 | 200 | 800 |
| Buffering agent: Sodium acetate | | | | | | | | 2 | | | |

For polymerisation purposes, the reversed emulsions are poured into open vessels and covered with a clock glass.

The reversed emulsions of Experiments Nos. 2, 3 and 11 polymerise at room temperature and yield over a period of 10 hours to 5 days, hard, solid blocks, which can be cut and which feel completely dry after the surface has dried off, although they consist, as in case 2, of up to 90% of water. They can be dried by heating in a vacuum chamber to temperatures between 50 and 90° C. and be converted into porous material of low density. The latter is applicable to all polymerised reversed emulsions.

The emulsions of Experiments Nos. 5, 8 and 9 are polymerised at 30° C. in a drying chamber and in principle supply similar products.

The reversed emulsions 1 and 10 are initially partly polymerised for 10 hours at 30° C. and then the temperature is raised over a period of 48 hours to 80° C. and the emulsions are then completely polymerised.

The reversed emulsions polymerised with water-soluble activators supply polymers which still contain inorganic substance after drying. Where necessary, these substances can be removed with water or by dissolving and reprecipitating.

*Examples 12 to 15*

For the production of the reversed monomer emulsions in the following table, a graft copolymer of a mixture of vinyl acetate and vinyl propionate (1:1) on to half the quantity by weight of polyalkylene oxide having a molecular weight 1600, which had been stirred beforehand with 1.5 parts by weight of maleic acid anhydride at 110° C. for three hours, was used as emulsifier.

In these following examples the reversed emulsions are poured in to open silicone resin moulds and polymerized. The polymerized materials feel completely dry and may be manufactured by means of plastic cutting tools.

| Examples | 12 | 13 | 14 | 15 |
|---|---|---|---|---|
| Monomer type | A mixture of 100 parts styrene and 25 parts polyester of 0.3 mole maleic anhydride, 0.7 mole phthalic anhydride, 1.0 mol butanediol-(1.3) | A mixture of 50 parts ethyl acrylate and 50 methyl acrylate | Vinyl propionate | Acrylonitrile |
| Monomer amount | 100 25 | 50 50 | 100 | 100 |
| Emulsifier | 6 | 5 | 7 | 10 |
| Water | 500 | 600 | 450 | 400 |
| Azodiisobutyric acid dinitrile | — | — | 1 | — |
| $K_2S_2O_3$ | 2 | 1 | — | 1 |
| $Na_2S_2O_5$ | 1 | 1 | — | 1 |
| Sodium acetate | 3 | 2 | — | — |
| Exclusion of air | — | + | + | + |
| Reaction temperature | 25 | 40 | 50 | 30 |
| Reaction time | 16 | 24 | 18 | 25 |

We claim:

1. Process for polymerization of a polymerizable organic water-insoluble monomer containing at least one $CH_2=C<$-group which comprises mixing said polymerizable water-insoluble monomer with a graft copolymer emulsifier which is soluble in said polymerizable monomer and which has been obtained by grafting a polymerizable vinyl monomer to a water-soluble polyalkylene oxide containing polyethylene oxide units and having a molecular weight of at least 500, introducing water into the mixture with stirring to form a water-in-oil emulsion containing 5 to 4,000% by weight of water, based on the total amount of monomer, and polymerizing said water-in-oil emulsion with the aid of 0.1 to 5% by weight, based on the total monomer quantity, of a free radical-forming substance.

2. Process of claim 1, wherein as graft copolymers polymeric materials are employed which have been obtained by grafting (1) a vinylidene monomer selected from the group consisting of a polyvinyl ester of a saturated aliphatic monocarboxylic acid, an ester of acrylic acid with an aliphatic saturated monohydric alcohol having from 1 to 6 carbon atoms, an ester of methacrylic acid with an aliphatic monohydric alcohol having from 1 to 6 carbon atoms, on to (2) a water-soluble polyalkylene oxide containing at least two polyethylene oxide units and having a molecular weight of at least 500.

3. Process of claim 2, wherein said water-soluble polyalkylene oxide is a polyethylene oxide having a molecular weight of at least 500.

4. Process of claim 2, wherein said water-soluble polyalkylene oxide is a copolymer of ethylene oxide and from 1 to 10 percent of propylene oxide.

5. Process of claim 1, wherein said polymerizable water-insoluble monomer containing at least one $CH_2=C<$-grouping is a member selected from the grouping consisting of a polyvinyl ester of an aliphatic saturated monocarboxylic acid having from 2 to 4 carbon atoms, styrene, an ester of acrylic acid with a saturated monohydric alcohol containing from 1 to 6 carbon atoms, an ester of methacrylic acid with a saturated monohydric alcohol containing from 1 to 6 carbon atoms, and acrylonitrile.

6. Process of claim 2, wherein as the polymerizable organic water-insoluble monomer styrene is polymerized in the presence of an unsaturated polyester of an $\alpha,\beta$-ethylenically unsaturated dicarboxylic acid and a dihydric alcohol, the ratio between said unsaturated polyester and styrene being between 9:1 and 1:9.

7. Process of claim 1, wherein said free radical forming substance is an organic monomer-soluble peroxy compound.

8. Process of claim 1, wherein said free radical-forming substance is an inorganic, water-soluble peroxy compound.

9. Process of claim 8, wherein said inorganic peroxy compound is employed in combination with a reducing agent able to form a redox system with said inorganic peroxy compound.

10. Process of claim 1, wherein said graft copolymer is applied in amounts of from 0.1 up to 20 percent by weight, based on the monomer phase.

11. Process of claim 2, which comprises using as emulsifying graft copolymer a substance obtained by grafting a vinylester on polyethylene oxide in an amount ranging between 30–300 percent by weight, based on polyethylene oxide.

12. The process of polymerization in water-in-oil emulsion which comprises dissolving (1) a graft copolymer emulsifier which has been obtained by grafting a polymerizable vinyl monomer to a water-soluble polyalkylene oxide containing polyethylene oxide units and having a molecular weight of at least 500, in (2) a polymerizable water-insoluble monomer containing at least one $CH_2=C<$-group, said graft copolymer emulsifier being soluble in said monomer and the amount of said graft copolymer emulsifier being within 0.1–20% by weight, based on the weight of said water-insoluble monomer, (3) introducing water into said water-insoluble monomer/graft copolymer emulsifier system by slow stirring, the quantity of water to be incorporated into said reversed emulsion amounting to 5–4,000% by weight, based on the total amount of said monomer and (4) polymerizing said reversed emulsion with the aid of 0.1–5% by weight, based on total weight of said monomer, of a free radical-forming substance.

References Cited by the Examiner

UNITED STATES PATENTS

| 2,473,801 | 6/1949 | Kropa | 260—45.4 |
| 2,519,870 | 8/1950 | Amigo | 260—29.6 |

FOREIGN PATENTS

| 612,883 | 1/1961 | Canada. |

WILLIAM H. SHORT, *Primary Examiner.*

LOUISE P. QUAST, *Examiner.*

C. A. WENDEL, *Assistant Examiner.*